US011518908B2

(12) United States Patent
Jang et al.

(10) Patent No.: US 11,518,908 B2
(45) Date of Patent: Dec. 6, 2022

(54) WATER-REPELLENT COATING COMPOSITION AND WATER-REPELLENT COATING SUBSTRATE COATED THEREWITH

(71) Applicant: DONGJIN SEMICHEM CO., LTD., Incheon (KR)

(72) Inventors: Seong Keun Jang, Seongnam-si (KR); Seong Yeon Oh, Seongnam-si (KR); Doo Shik Kim, Seongnam-si (KR); Seung Sock Choi, Seongnam-si (KR); Dong Jin Nam, Seongnam-si (KR); Kyu Soon Shin, Seongnam-si (KR)

(73) Assignee: DONGJIN SEMICHEM CO., LTD., Incheon (KR)

( * ) Notice: Subject to any disclaimer, the term of this patent is extended or adjusted under 35 U.S.C. 154(b) by 622 days.

(21) Appl. No.: 16/473,697

(22) PCT Filed: Dec. 28, 2017

(86) PCT No.: PCT/KR2017/015636
§ 371 (c)(1),
(2) Date: Jun. 26, 2019

(87) PCT Pub. No.: WO2018/124767
PCT Pub. Date: Jul. 5, 2018

(65) Prior Publication Data
US 2019/0352533 A1 Nov. 21, 2019

(30) Foreign Application Priority Data

Dec. 30, 2016 (KR) .................. 10-2016-0184395

(51) Int. Cl.
*C09D 183/08* (2006.01)
*C08G 77/24* (2006.01)
*C08K 5/52* (2006.01)
*C09D 183/04* (2006.01)
*C09D 7/20* (2018.01)
*C09D 7/47* (2018.01)
*C08K 3/32* (2006.01)
*C09D 5/16* (2006.01)
*C08K 5/521* (2006.01)
*C09K 3/18* (2006.01)

(52) U.S. Cl.
CPC .......... *C09D 183/04* (2013.01); *C08G 77/24* (2013.01); *C08K 3/32* (2013.01); *C08K 5/52* (2013.01); *C08K 5/521* (2013.01); *C09D 5/1675* (2013.01); *C09D 7/20* (2018.01); *C09D 7/47* (2018.01); *C09D 183/08* (2013.01); *C09K 3/18* (2013.01); *C08K 2003/329* (2013.01)

(58) Field of Classification Search
CPC ........ C08K 5/521; C08K 5/525; B32B 27/283
USPC .................................. 528/42; 524/140, 145; 106/287.13–287.16, 13; 428/447–452
See application file for complete search history.

(56) References Cited

U.S. PATENT DOCUMENTS

| 5,574,967 | A | * | 11/1996 | Dent | ..................... | H03F 1/0294 |
| | | | | | | 455/12.1 |
| 7,049,384 | B1 | * | 5/2006 | Friebe | .................... | C09J 183/04 |
| | | | | | | 528/17 |
| 8,329,305 | B2 | * | 12/2012 | Motoyama | ............. | C08G 77/08 |
| | | | | | | 528/42 |
| 2001/0019773 | A1 | | 9/2001 | Akamatsu et al. | | |
| 2004/0082699 | A1 | * | 4/2004 | Brown | ...................... | B01L 3/00 |
| | | | | | | 524/462 |
| 2011/0244245 | A1 | | 10/2011 | Elgimiabi | | |
| 2012/0251728 | A1 | * | 10/2012 | Kuwata | ................ | C09D 183/08 |
| | | | | | | 106/2 |
| 2013/0324652 | A1 | | 12/2013 | Pompignano et al. | | |
| 2014/0162069 | A1 | * | 6/2014 | Fukushima | .......... | C09D 183/08 |
| | | | | | | 524/868 |
| 2015/0004396 | A1 | | 1/2015 | Elgimiabi | | |
| 2015/0274991 | A1 | * | 10/2015 | Lee | .......................... | C09D 7/63 |
| | | | | | | 257/532 |
| 2015/0307754 | A1 | * | 10/2015 | Combs | ................... | A61K 47/36 |
| | | | | | | 428/355 CP |

FOREIGN PATENT DOCUMENTS

| CN | 103261338 | 8/2013 |
| JP | H9-255919 | 9/1997 |
| JP | H10-120445 | 5/1998 |
| JP | 2003-064348 | 3/2003 |
| JP | 2005-186576 | 7/2005 |
| JP | 2009-191130 | 8/2009 |
| JP | 2020-030313 | 2/2020 |
| KR | 10-2006-0107097 | 10/2006 |
| KR | 10-2013-0086281 | 8/2013 |
| KR | 10-2013-0103023 | 9/2013 |
| KR | 10-2014-0004128 | 1/2014 |
| KR | 10-2016-0087568 | 7/2016 |

(Continued)

OTHER PUBLICATIONS

The product information page entitled, "Thermal Management/Heat Transfer with 3M Fluorinert and Novec Fluids" available at https://www.besttechnologyinc.com/precision-cleaning-chemistries/3m-novec-engineered-fluids-solvents/thermal-management-heat-transfer/?utm_term=fc%2070&utm_campaign=Chemical&utm_source=adwords.*

(Continued)

*Primary Examiner* — Marc S Zimmer
(74) *Attorney, Agent, or Firm* — Lex IP Meister, PLLC

(57) ABSTRACT

A water-repellent coating composition, and particularly, a water-repellent coating composition having improved adhesion and durability by including a phosphoric acid or a phosphoric acid-based compound, is provided.

5 Claims, 2 Drawing Sheets

(56) References Cited

FOREIGN PATENT DOCUMENTS

| | | |
|---|---|---|
| WO | 2018235778 | 12/2018 |
| WO | 2019049754 | 3/2019 |

OTHER PUBLICATIONS

JPO, Office Action of JP 2019-535942 dated Oct. 26, 2021.
SIPO, Office Action of CN 201780080580.1 dated Dec. 23, 2020.
WIPO, A PCT Search Report & Written Opinion of PCT/KR2017/015636 dated Apr. 20, 2018.

* cited by examiner

[FIG. 1]
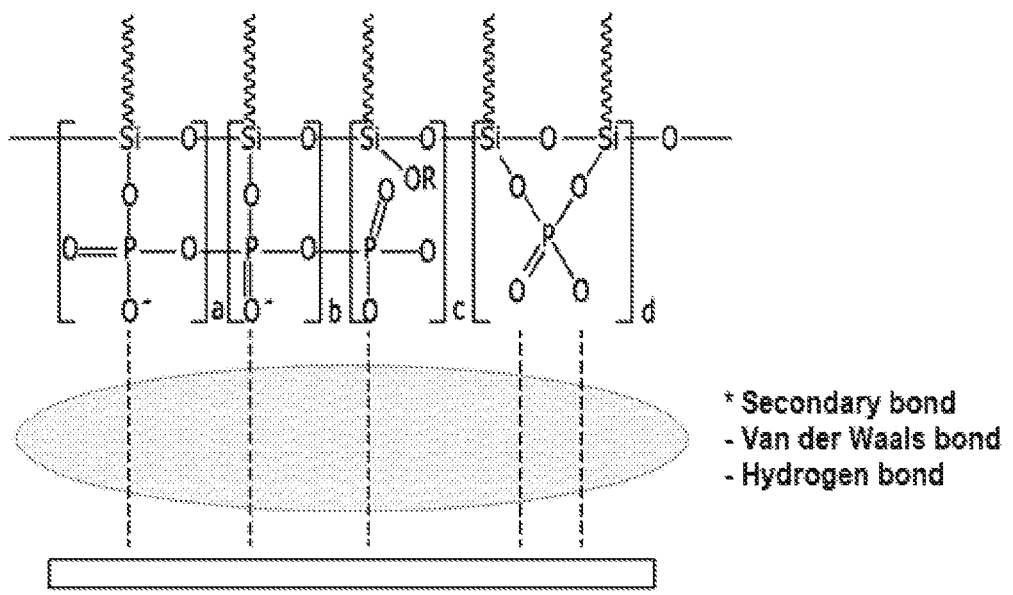

[FIG. 2]
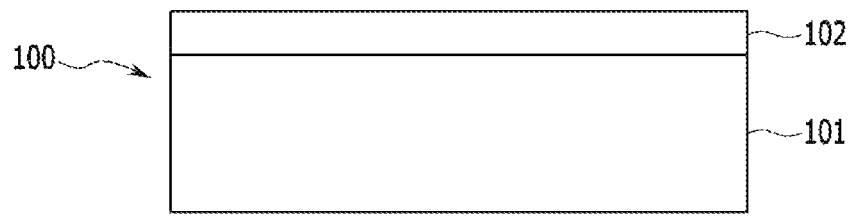
[FIG. 3]
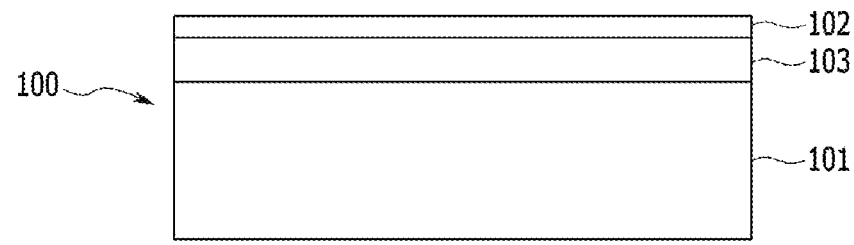

WATER-REPELLENT COATING COMPOSITION AND WATER-REPELLENT COATING SUBSTRATE COATED THEREWITH

TECHNICAL FIELD

The present invention relates to a water-repellent coating composition, and particularly, to a water-repellent coating composition having improved adhesion and durability by including a phosphoric acid or a phosphoric acid-based compound.

BACKGROUND ART

The following description merely provides background information related to the present invention and may not constitute the prior art.

Recently, there has been a trend from use of glass or tempered glass substrates toward use of plastic substrates in portable electronic products such as smart phones, tablet PCs, notebooks, etc. and display products for lightness and shatter-proofing of the products. However, plastic substrates have not been practically applied to products because they have drawbacks of poor mechanical strength, durability, weather resistance, and optical properties, as compared with glass substrates.

To overcome the drawbacks of plastic substrates, studies have been actively conducted such as on a hard coating layer being used to complement the mechanical strength and durability, and the surface is additionally provided with functions such as hydrophilic and water-repellent properties, flame retardancy, antifouling, antireflection, optical filtering, reflectance, and absorptance control through functional coating, thereby improving optical and emotional characteristic as well as mechanical properties at a similar level to those of glass products.

In particular, a functional coating having a water-repellent property is one of the most commonly used functional coating technologies used for the outermost surface, because the coating technology may exhibit antifouling against various contaminants, easy-clean and anti-fingerprint performance, as well as water repellency.

However, while the functional coating having a water-repellent property is easily applied to glass having a high surface energy, it generates problems of durability in plastic substrates having a relatively low surface energy due to low adhesion to a substrate. Therefore, it is difficult to directly apply the functional coating to plastic substrates.

DISCLOSURE

Technical Problem

In order to solve the above problems of the prior art, an object of the present invention is to provide a water-repellent coating composition having improved adhesion and durability by including a phosphoric acid or a phosphoric acid-based compound.

Further, another object of the present invention is to provide a water-repellent coating substrate including a water-repellent coating layer formed by the composition, and an article provided with the water-repellent coating substrate.

Technical Solution

In order to achieve the above objects, the present invention provides a water-repellent coating composition including a coating composition, a solvent, and an adhesion-enhancing additive.

Further, the present invention provides a water-repellent coating substrate, wherein a coating layer of the water-repellent coating composition is formed on one surface or the other surface of the substrate.

Further, the present invention provides an article provided with the water-repellent coating substrate.

Effect of the Invention

A water-repellent coating composition according to the present invention may include a phosphoric acid or a phosphoric acid-based compound to form stronger adhesion by a secondary bond (Van der Waals bond and hydrogen bond) without surface-treatment in plastic substrates, thereby providing a water-repellent coating substrate having excellent durability only by simple wet coating and enabling coating of a large area with low processing costs.

Accordingly, the composition of the present invention may be applied to a wide range of fields including protective films for mobile phones, interior/exterior materials for automobiles, interior/exterior materials of household appliances, paints, and protective layers of various industrial products as well as displays of electronic products such as smart phones, tablet PCs, LCD monitors, indoor/outdoor advertising displays, etc.

BRIEF DESCRIPTION OF DRAWINGS

FIG. 1 illustrates strong adhesion of a water-repellent coating layer according to the present invention by a secondary bond;

FIG. 2 illustrates a water-repellent coating substrate according to one embodiment of the present invention; and FIG. 3 illustrates a water-repellent coating substrate according to one embodiment of the present invention.

DETAILED DESCRIPTION OF THE EMBODIMENTS

Hereinafter, exemplary embodiments of the present invention will be described in detail with reference to the accompanying drawings, which will be readily performed by those skilled in the art to which the present invention pertains. However, the present invention is not limited to the exemplary embodiments disclosed herein, and may be implemented in diverse forms.

Throughout the specification, when an element is referred to as "including" a component, it means that the element may further include another component unless otherwise mentioned, and it is not to be interpreted as excluding another component.

A water-repellent coating composition of the present invention is characterized by including a coating composition, a solvent, and an adhesion-enhancing additive.

In the present invention, the coating composition may include a silane compound.

In the present invention, the silane compound may include a fluorinated silane compound, a hydrocarbon-based silane compound, or a mixture thereof, and specifically, the silane compound may be one or more selected from the group consisting of trifluoromethyltrimethoxysilane, trifluoromethyltriethoxysilane, trifluoropropyltrimethoxysilane, trifluoropropyltriethoxysilane, nonafluorobutylethyltrimethoxysilane, nonafluorobutylethyltriethoxysilane, nonafluorohexyltrimethoxysilane, nonafluorohexyltriethoxysilane, heptadecafluorodecyltrimethoxysilane, heptadecafluorodecyltriethoxysilane, heptadecafluorodecyltriisopropylsilane, 3-trimethoxysilylpropylpentadecafluorooctate, 3-triethoxysilylpropylpentadecafluorooctate, 3-trimethoxysilylpropylpentadecafluoroocticamide, 3-triethoxysilylpropylpentadecafluoroocticamide, 2-trimethoxysilylethylpentadecafluorodecylsulfide, 2-triethoxysilylethylpentadecafluorodecylsulfide, pentafluorophenyltrimethoxysilane, pentafluorophenyltriethoxysilane, 4-(perfluorotolyl)trimethoxysilane, 4-(perfluorotolyl)triethoxysilane, dimethoxybis(pentafluorophenyl)silane, diethoxybis(4-pentafluorotolyl)silane, or trialkoxysilane having hydrocarbon having 1 to 18 carbon atoms, and isomers, derivatives, and polymers thereof, trimethoxyphenylsilane, trimethoxy(2-phenylethyl)silane, (triethoxysilyl)cyclohexane, derivatives, and polymers thereof.

The solvent applicable in the present invention is not particularly limited, as long as it is a solvent that has a solubility and does not affect reactions. The solvent may be specifically an organic solvent or a fluorinated solvent, and more specifically, one or more selected from the group consisting of 1,3-bistrifluoromethylbenzene, ethylnonafluorobutylether, ethylnonafluoroisobutylether, perfluorobutylethylether, perfluorohexylmethylether, perfluorocarbon, hydrofluoroether, and derivatives thereof.

Due to the solvent, the water-repellent coating composition of the present invention may be used in wet-coating, and therefore the coating may be performed without separate dry coating equipment, so that the water-repellent coating composition may be used universally and the process cost may be reduced.

In the present invention, the adhesion-enhancing additive functions to improve adhesion by binding to the silane compound and forming a Van der Waals bond or a hydrogen bond with a substrate to induce binding between the substrate and the silane compound.

The adhesion-enhancing additive may include a phosphoric acid or a phosphoric acid-based compound, specifically, phosphoric acid, trimethylphosphate, triethylphosphate, etc. When the phosphoric acid or the phosphoric acid-based compound is used, a part of reactive groups thereof may form a covalent bond with the silane compound and another part of reactive groups thereof induces a strong secondary bond with a substrate, thereby forming a water-repellent coating thin layer having improved adhesion and durability.

Referring to FIG. 1, the water-repellent coating layer according to the present invention may form a secondary bond such as a Van der Waals bond or a hydrogen bond on the surface of the substrate to have improved adhesion with respect to the substrate.

The adhesion-enhancing additive according to one embodiment of the present invention may be included in an amount of 3 parts by weight to 100 parts by weight, specifically, 5 parts by weight to 30 parts by weight with respect to 100 parts by weight, of the coating composition. When the amount of the adhesion-enhancing additive satisfies the above range, adhesion of the coating composition to the substrate may be excellent and distribution of the silane compound may be uniform.

A viscosity of the water-repellent coating composition according to one embodiment of the present invention may be controlled by the solvent according to the purpose of use, and for example, the water-repellent coating composition may have a viscosity of 0.1 cP to 500 cP, specifically a viscosity of 0.1 cP to 80 cP, in order to allow wet coating.

The water-repellent coating composition of the present invention may further include one or more additives such as an antioxidant, a leveling agent, etc., as needed.

The additive may include a polyether-modified polydimethylsiloxane (e.g., BYK-300, BYK-301, BYK-302, BYK-331, BYK-335, BYK-306, BYK-330, BYK-341, BYK-344, BYK-307, BYK-333, BYK-310, etc. of BYK), a polyether-modified hydroxy-functional polydimethylsiloxane (e.g., BYK-308, BYK-373, etc.), a methylalkylpolysiloxane (e.g., BYK-077, BYK-085, etc.), a polyether-modified methylalkylpolysiloxane (e.g., BYK-320, BYK-325, etc.), a polyester-modified poly-methyl-alkyl-siloxane (e.g., BYK-315, etc.), an aralkyl-modified methylalkyl polysiloxane (e.g., BYK-322, BYK-323, etc.), a polyester-modified hydroxy functional polydimethylsiloxane (e.g., BYK-370, etc.), an acrylic functional polyester-modified polydimethylsiloxane (e.g., BYK-371, BYK-UV 3570, etc.), a polyetherpolyester-modified hydroxy functional polydimethylsiloxane (e.g., BYK-375, etc.), a polyether-modified dimethylpolysiloxane (e.g., BYK-345, BYK-348, BYK-346, BYK-UV3510, BYK-332, BYK-337, etc.), a non-ionic acrylic copolymer (e.g., BYK-380, etc.), an ionic acrylic copolymer (e.g., BYK-381, etc.), a polyacrylate (e.g., BYK-353, BYK-356, BYK-354, BYK-355, BYK-359, BYK-361 N, BYK-357, BYK-358 N, BYK-352, etc.), a polymethacrylate (e.g., BYK-390, etc.), a polyether-modified acryl functional polydimethylsiloxane (e.g., BYK-UV 3500, BYK-UV3530, etc.), a polyether-modified siloxane (e.g., BYK-347, etc.), an alcohol alkoxylate (e.g., BYK-DYNWET 800, etc.), an acrylate (e.g., BYK-392, etc.), a silicone-modified polyacrylate (OH-functional) (e.g., BYK-Silclean 3700, etc.), etc.

Further, the present invention provides a water-repellent coating substrate, wherein a coating layer of the water-repellent coating composition consisting of a phosphoric acid or a phosphoric acid-based compound is formed on one surface or the other surface of the substrate.

FIGS. 2 and 3 each illustrate a water-repellent coating substrate on which the water-repellent coating layer according to one embodiment of the present invention is formed.

Referring to FIG. 2, a water-repellent coating substrate 100 of the present invention may have a water-repellent coating layer 102 which is formed by applying the water-repellent coating composition onto the surface of a substrate 101. Referring to FIG. 3, the water-repellent coating substrate 100 of the present invention may include the substrate 101; a hard coating layer 103 formed on the surface of the substrate; and the water-repellent coating layer 102 formed on the surface of the hard coating layer 103.

In the present invention, the substrate 101 is not particularly limited, and a specific example thereof may be selected from plastic films known in the art, and if necessary, are appropriately selected from transparent or translucent plastic films according to use. For example, polyester films such as polyethylene terephthalate, polybutylene terephthalate, polyethylene naphthalate, etc., polyethylene films, polypropylene films, cellophane, diacetyl cellulose films, triacetyl cellulose films, acetyl cellulose butyrate films, polyvinyl chloride films, polyvinylidene chloride films, polyvinyl alcohol films, ethylene-vinyl acetate copolymer films, polystyrene films, polycarbonate films, polymethyl methacrylate films, polymethyl pentene films, polysulfone films, polyether ether ketone films, polyether sulfone films, polyether imide films, polyimide films, fluorine resin films, polyamide films, acryl resin films, norbornene-based resin films, cycloolefin resin films, etc. may be used, and glass substrates may also be used.

The hard coating layer 103 may be formed by applying a known hard coating composition onto the substrate 101, and a thickness thereof may be arbitrarily controlled. In the water-repellent coating substrate 100 of the present invention, a thickness of the hard coating layer 103 may be specifically controlled to 2 to 60 µm, and more specifically 10 to 30 µm. When the thickness of the hard coating layer is within the above range, durability of the water-repellent coating substrate 100 may be secured without deteriorating other physical properties of the substrate.

The water-repellent coating layer 102 according to the present invention may be prepared by applying and curing the water-repellent coating composition including the adhesion-enhancing additive on the surface of the substrate 101 or the hard coating layer 103.

In the present invention, the adhesion-enhancing additive may consist of a phosphoric acid or a phosphoric acid-based compound, and therefore, adhesion between the water-repellent coating layer 102 and the substrate 101 or the hard coating layer 103 may be improved only by a simple coating process without a complicated process, thereby improving abrasion resistance and durability.

A method of applying the water-repellent coating composition onto the substrate 101 or the hard coating layer 103 may be performed by any one coating method selected from spray coating, dip coating, spin coating, die coating, comma coating, screen coating, ink jet printing, pad printing, knife coating, kiss coating, bar coating, and gravure coating.

The water-repellent coating layer 102 according to the present invention may have excellent adhesion, and thus a change of haze values before and after a scratch resistance test, for example, a scratch resistance test in accordance with ISO 14782, may be controlled to 0.1% or less, specifically 0.05% or less.

Further, the water-repellent coating layer 102 according to the present invention may have excellent adhesion, and thus a change of DI contact angles before and after an abrasion resistance test, for example, an abrasion resistance test in accordance with KS B ISO 9211-4, may be 5° or less, specifically 3° or less.

Further, the water-repellent coating substrate 100 according to the present invention may have excellent durability for water repellency, and thus a change of DI contact angles before and after a salt mist test in accordance with JIS K 5400 may be 5° or less, specifically 3° or less.

Further, the water-repellent coating substrate 100 according to the present invention may have excellent durability for water repellency, and thus a change of DI contact angles before and after a high temperature/high humidity test in accordance with JIS C 7021 may be 5° or less, specifically 3° or less.

The water-repellent coating composition according to the present invention may include the phosphoric acid or the phosphoric acid-based compound to form stronger adhesion by a secondary bond (Van der Waals bond and hydrogen bond) without surface-treatment in plastic substrates, thereby providing a water-repellent coating substrate having excellent durability only by simple wet coating and enabling coating of a large area with low processing costs.

Accordingly, the composition of the present invention may be applied to a wide range of fields including protective films for mobile phones, interior/exterior materials for automobiles, interior/exterior of household appliances, paints, and protective layers of various industrial products as well as displays of electronic products such as smart phones, tablet PCs, LCD monitors, indoor/outdoor advertising displays, etc.

Hereinafter, specific examples will be provided for better understanding of the present invention. However, the following examples are for illustrative purposes only, and the scope of the present invention is not intended to be limited by the following examples.

PREPARATION EXAMPLE 0.2 g of a fluorinated silane (DAIKIN, OPTOOL UD509), 50 g of a fluorinated solvent (3M, Novec-7200), 2 g of ethanol (Burdick&Jackson), and 0.05 g of phosphoric acid (Shinetsu, D-220) were mixed and stirred for 10 minutes to prepare a water-repellent coating composition.

COMPARATIVE PREPARATION EXAMPLE

A water-repellent coating composition was prepared in the same manner as in the preparation example, except that phosphoric acid (Shinetsu, D-220) was not included.

Example 1

The water-repellent coating composition of the preparation example was flow-coated onto a PET (SKC, 250 µm) substrate, and then thermosetting was performed in an oven at 85° C. for 30 minutes to form a water-repellent coating layer.

Example 2

A water-repellent coating layer was formed in the same manner as in Example 1, except that an LCD glass (100 mm×100 mm, thickness of 0.5 T (500 µm)) was used as a substrate.

Example 3

A water-repellent coating layer was formed in the same manner as in Example 1, except that a hard coating/PC (Dongjin Semichem, 680 µm) was used as a substrate.

Example 4

A water-repellent coating layer was formed in the same manner as in Example 3, except that curing was performed at room temperature for 30 minutes.

Example 5

A water-repellent coating layer was formed in the same manner as in Example 3, except that the coating composition was spray-coated.

Comparative Example 1-1

A water-repellent coating layer was formed in the same manner as in Example 1, except that the composition including no phosphoric acid (Shinetsu, D-220) of a comparative preparation example was used.

Comparative Example 1-2

A water-repellent coating layer was not formed on the PET (SKC, 250 μm) substrate which was used in Example 1 and Comparative Example 1-1.

Comparative Example 2-1

A water-repellent coating layer was formed in the same manner as in Example 2, except that the composition including no phosphoric acid (Shinetsu, D-220) of a comparative preparation example was used.

Comparative Example 2-2

A water-repellent coating layer was not formed on the LCD glass (100 mm×100 mm, thickness of 0.5 T (500 μm)) which was used in Example 2 and Comparative Example 2-1.

Comparative Example 3-1

A water-repellent coating layer was formed in the same manner as in Example 3, except that the composition including no phosphoric acid (Shinetsu, D-220) of a comparative preparation example was used.

Comparative Example 3-2

A water-repellent coating layer was not formed on the hard coating/PC (Dongjin Semichem, 680 μm) which was used in Example 3 and Comparative Example 3-1.

Comparative Example 4

A water-repellent coating layer was formed in the same manner as in Example 4, except that the composition including no phosphoric acid (Shinetsu, D-220) of a comparative preparation example was used.

Comparative Example 5

A water-repellent coating layer was formed in the same manner as in Example 5, except that the composition including no phosphoric acid (Shinetsu, D-220) of a comparative preparation example was used.

Experimental Example 1

Physical properties of the water-repellent coating layers of Examples 1 and 2 and Comparative Examples 1-1, 1-2, 2-1, and 2-2 before and after applying to different substrates were compared, and the results are shown in Table 1 below.

The physical properties were measured by the following methods.

Surface hardness: Measurement was performed in accordance with JIS 5600-5-4 under a harsher condition of a load of 1 kg$_f$. Mitsubishi pencils were used, and measurement was performed five times for each pencil hardness. When two or more scratches were generated, it was determined as a defective product.

Transmittance and Haze: Measurement was performed in accordance with ISO 14782 using COH-400 (Nippon Denshoku). Measurement was performed five times for each sample, and mean values were described.

Eraser abrasion resistance test: Measurement was performed in accordance with KS B ISO 9211-4. At this time, an eraser for the abrasion resistance test was used as the eraser, and contact angle values of the substrate surface before and after reciprocating 1500 times with a load of 500 g$_f$ were described.

Scratch resistance test: Measurement was performed in accordance with JIS K5600-5-9 using #0000 steel wool with a load of 1 kg$_f$. At this time, haze values of the substrate before and after reciprocating 10,000 times which is a harsher condition were described.

Salt mist test: Measurement was performed in accordance with JIS K 5400 under conditions of 35° C. and a salt concentration of 5% for 72 hours. To examine whether the functional coating films have durability against salt, contact angle values of the substrate surface before and after the test were measured and described.

High temperature/high humidity test: Measurement was performed in accordance with JIS C 7021 under conditions of a temperature of 85° C. and humidity of 85% for 120 hours. To examine whether the functional coating films have durability under high temperature/high humidity conditions, contact angle values of the substrate surface before and after the test were measured and described.

TABLE 1

| | | | Substrate | | | | | |
| --- | --- | --- | --- | --- | --- | --- | --- | --- |
| | | | PET (SKC, 250 μm) | | | LCD glass (500 μm) | | |
| | Coating method | | Example 1 | Comparative Example 1-1 | Comparative Example 1-2 | Example 2 | Comparative Example 2-1 | Comparative Example 2-2 |
| | Surface hardness (1 kg$_f$) | | 6B | 8B | ≤9B | 9H | 9H | 9H |
| | Transmittance | | 90.45 | 90.02 | 89.86 | 92.81 | 92.77 | 92.72 |
| Scratch resistance | Haze (%) | Before | 1.08 | 1.13 | 1.21 | 0.12 | 0.12 | 0.12 |
| | | After | 1.08 | cloudy | cloudy | 0.14 | 0.21 | 0.24 |
| Abrasion resistance | DI contact angle (°) | Before | 119 | 118 | 60 | 120 | 120 | 47.2 |
| | | After | 119 | 63 | — | — | 95 | — |
| | DIM contact angle (°) | Before | 99 | 99 | 55 | 100 | 100 | 62.7 |
| | | After | 99 | 40 | — | 100 | 70 | — |

TABLE 1-continued

| | | | Substrate | | | | | |
| | | | PET (SKC, 250 μm) | | | LCD glass (500 μm) | | |
| | Coating method | | Example 1 | Comparative Example 1-1 | Comparative Example 1-2 | Example 2 | Comparative Example 2-1 | Comparative Example 2-2 |
| --- | --- | --- | --- | --- | --- | --- | --- | --- |
| Salt mist | DI contact angle (°) | Before | 119 | 119 | 60 | 120 | 120 | 47.2 |
| | | After | 118 | 60 | — | 119 | 90 | — |
| High temperature/ High humidity | DI contact angle (°) | Before | 119 | 119 | 60 | 120 | 120 | 47.2 |
| | | After | 119 | 60 | — | 120 | 90 | — |

*DI: deionized water, DIM: diiodomethane

As shown in Table 1, the water-repellent coating layers including the phosphoric acid-based compound of Example 1 and Example 2 according to the present invention showed excellent values in surface hardness, transmittance, scratch resistance, and abrasion resistance, irrespective of the kind of the substrate, indicating that they improved adhesion irrespective of the substrate. In particular, the change of DI contact angle was 2° or less in the salt mist test and the high temperature/high humidity test, indicating high reliability.

Experimental Example 2

Physical properties of the water-repellent coating layers of Examples 3 and 4 and Comparative Examples 3-1, 3-2, and 4 before and after coating according to the curing temperature were compared, and the results are shown in Table 2 below.

As shown in Table 2, the water-repellent coating layers including the phosphoric acid-based compound of Example 3 and Example 4 according to the present invention showed excellent values in surface hardness, transmittance, scratch resistance, and abrasion resistance, irrespective of the curing temperature, indicating that they improved adhesion irrespective of the curing temperature. In particular, the change of DI contact angle was 2° or less in the salt mist test and the high temperature/high humidity test, indicating high reliability.

Experimental Example 3

Physical properties of the water-repellent coating layers of Examples 3 and 5 and Comparative Examples 3-1, 3-2, and 5 before and after coating according to the coating method were compared, and the results are shown in Table 3 below.

TABLE 2

| | | | Substrate Hard coating/PC (Dongjin Semichem, 680 μm) | | | | |
| | Coating method | | Comparative Example 3-2 | Example 3 | Comparative Example 3-1 | Example 4 | Comparative Example 4 |
| --- | --- | --- | --- | --- | --- | --- | --- |
| Surface hardness (1 kg$_f$) | | | 9H | 9H | 9H | 9H | 9H |
| Transmittance | | | 91.60 | 91.79 | 91.52 | 91.65 | 91.42 |
| Scratch resistance | Haze (%) | Before | 0.20 | 0.22 | 0.22 | 0.26 | 0.25 |
| | | After | 8.52 | 0.23 | 7.33 | 0.25 | 8.12 |
| Abrasion resistance | DI contact angle (°) | Before | 91 | 120 | 119 | 119 | 120 |
| | | After | — | 119 | 67 | 119 | 66 |
| | DIM contact angle (°) | Before | 69 | 100 | 99 | 101 | 100 |
| | | After | — | 100 | 40 | 100 | 41 |
| Salt mist | DI contact angle (°) | Before | 91 | 120 | 119 | 119 | 120 |
| | | After | — | 119 | 64 | 119 | 63 |
| High temperature/ High humidity | DI contact angle (°) | Before | 69 | 120 | 119 | 119 | 120 |
| | | After | — | 119 | 64 | 119 | 64 |

TABLE 3

| | Coating method | | Comparative Example 3-2 | Example 3 | Comparative Example 3-1 | Example 5 | Comparative Example 5 |
|---|---|---|---|---|---|---|---|
| Surface hardness (1 kg$_f$) | | | 9H | 9H | 9H | 9H | 9H |
| Transmittance | | | 91.60 | 91.79 | 91.52 | 91.77 | 91.42 |
| Scratch resistance | Haze (%) | Before | 0.20 | 0.22 | 0.22 | 0.25 | 0.25 |
| | | After | 8.52 | 0.23 | 7.33 | 0.25 | 7.44 |
| Abrasion resistance | DI contact angle (°) | Before | 91 | 120 | 119 | 120 | 120 |
| | | After | — | 119 | 67 | 119 | 65 |
| | DIM contact angle (°) | Before | 69 | 100 | 99 | 100 | 100 |
| | | After | — | 100 | 40 | 100 | 42 |
| Salt mist | DI contact angle (°) | Before | 91 | 120 | 119 | 120 | 120 |
| | | After | — | 119 | 64 | 119 | 61 |
| High temperature/ High humidity | DI contact angle (°) | Before | 69 | 120 | 119 | 120 | 120 |
| | | After | — | 119 | 64 | 119 | 64 |

As shown in Table 3, the water-repellent coating layers including the phosphoric acid-based compound of Example 3 and Example 5 according to the present invention showed excellent values in surface hardness, transmittance, scratch resistance, and abrasion resistance, irrespective of the coating method, indicating that they improved adhesion irrespective of the coating method. In particular, the change of DI contact angle was 2° or less in the salt mist test and the high temperature/high humidity test, indicating high reliability.

The invention claimed is:

1. A water-repellent coating composition comprising:
   a coating composition including a silane compound;
   a solvent; and
   an adhesion-enhancing additive,
   wherein the silane compound is one or more selected from the group consisting of: trifluoromethyltrimethoxysilane; trifluoromethyltriethoxysilane; trifluoropropyltrimethoxysilane; trifluoropropyltriethoxysilane; nonafluorobutylethyltrimethoxysilane; nonafluorobutylethyltriethoxysilane; nonafluorohexyltrimethoxysilane; nonafluorohexyltriethoxysilane; heptadecafluorodecyltrimethoxysilane; heptadecafluorodecyltriethoxysilane; heptadecafluorodecyltriisopropylsilane; 3-trimethoxysilylpropylpentadecafluorooctate; 3-triethoxysilylpropylpentadecafluorooctate; 3-trimethoxysilylpropylpentadecafluoroocticamide; 3-triethoxysilylpropylpentadecafluoroocticamide; 2-trimethoxysilylethylpentadecafluorodecylsulfide; 2-triethoxysilylethylpentadecafluorodecylsulfide; pentafluorophenyltrimethoxysilane; pentafluorophenyltriethoxysilane; 4-(perfluorotolyl)trimethoxysilane; 4-(perfluorotolyl)triethoxysilane; dimethoxybis(pentafluorophenyl)silane; diethoxybis(4-pentafluorotolyl)silane; derivatives, and polymers thereof, and
   wherein the adhesion-enhancing additive includes a phosphoric acid or a phosphoric acid-based compound.

2. The water-repellent coating composition of claim 1, wherein the adhesion-enhancing additive is included in an amount of 3 parts by weight to 100 parts by weight with respect to 100 parts by weight of the coating composition.

3. The water-repellent coating composition of claim 1, wherein the solvent is one or more selected from the group consisting of 1,3-bistrifluoromethylbenzene, ethylnonafluorobutylether, ethylnonafluoroisobutylether, perfluorobutylethylether, perfluorohexylmethylether, perfluorocarbons, hydrofluoroethers, and derivatives thereof.

4. The water-repellent coating composition of claim 1, wherein the water-repellent coating composition has a viscosity of 0.1 cP to 500 cP.

5. The water-repellent coating composition of claim 1, wherein the coating composition further includes one or more additives selected from the group consisting of antioxidants and leveling agents.

* * * * *